(12) United States Patent
Arabi et al.

(10) Patent No.: US 8,044,697 B2
(45) Date of Patent: Oct. 25, 2011

(54) PER DIE TEMPERATURE PROGRAMMING FOR THERMALLY EFFICIENT INTEGRATED CIRCUIT (IC) OPERATION

(75) Inventors: Tawfik Arabi, Tigard, OR (US); Ali Muhtaroglu, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1450 days.

(21) Appl. No.: 11/478,472

(22) Filed: Jun. 29, 2006

(65) Prior Publication Data

US 2008/0001634 A1 Jan. 3, 2008

(51) Int. Cl.
*H03K 3/00* (2006.01)
(52) U.S. Cl. .......................... 327/299; 327/291; 713/320
(58) Field of Classification Search .................. 327/291, 327/299; 713/300, 320
See application file for complete search history.

(56) References Cited

U.S. PATENT DOCUMENTS

| | | | |
|---|---|---|---|
| 5,422,806 A | 6/1995 | Chen et al. | |
| 5,451,892 A | 9/1995 | Bailey | |
| 5,477,076 A | 12/1995 | Gay et al. | |
| 5,483,102 A | 1/1996 | Neal et al. | |
| 5,838,578 A * | 11/1998 | Pippin ............................ | 327/512 |
| 6,393,374 B1 | 5/2002 | Rankin et al. | |
| 6,889,332 B2 | 5/2005 | Helms et al. | |
| 6,967,877 B2 | 11/2005 | Chou | |
| 2003/0210505 A1 | 11/2003 | Partsch et al. | |
| 2004/0082086 A1 | 4/2004 | Arabi et al. | |
| 2005/0052919 A1 | 3/2005 | Chou | |

FOREIGN PATENT DOCUMENTS

| | | |
|---|---|---|
| JP | 7-44408 A | 2/1995 |
| JP | 2002-268769 A | 9/2002 |
| JP | 2003-195981 A | 7/2003 |
| JP | 2004-133646 A | 4/2004 |
| JP | 2005-196430 A | 7/2005 |
| JP | 2006-48175 A | 2/2006 |
| KR | 10-1996-0015135 | 5/1995 |
| KR | 10-2002-0007279 | 1/2002 |
| KR | 10-2002-0008594 | 1/2002 |

OTHER PUBLICATIONS

"International Preliminary Report on Patentability" received for PCT Application No. PCT/US2007/072315 dated Jan. 15, 2009, 6 pages.
"International Search Report and Written Opinion for Corresponding PCT Application", PCT/US2007/072315, 7 pgs.
Office Action received for German Patent Application No. 112007001150.5, mailed on Mar. 15, 2010, 2 pages of Office Action and 1 page of English translation.
Office Action received for Chinese Patent Application No. 200780019849.1, mailed on Apr. 1, 2010, 5 pages of Office Action and 5 pages of English translation.
Office Action Received for Korean Patent Application No. 2008-7031780, mailed on Jul. 30, 2010, 3 pages of English translation only.
Office Action received for Japanese Patent Application No. 2009-516760, mailed on Aug. 17, 2010, 3 pages of Office Action and 2 page of English translation.

* cited by examiner

*Primary Examiner* — Lincoln Donovan
*Assistant Examiner* — John Poos
(74) *Attorney, Agent, or Firm* — Caven & Aghevli LLC

(57) ABSTRACT

Methods and apparatus to provide per die temperature programming for thermally efficient integrated circuit (IC) operation are described. In some embodiments, the junction temperature of an IC component is determined, e.g., to reduce power consumption and/or improve performance. Other embodiments are also described.

19 Claims, 6 Drawing Sheets

PER DIE TEMPERATURE PROGRAMMING FOR THERMALLY EFFICIENT INTEGRATED CIRCUIT (IC) OPERATION

BACKGROUND

The present disclosure generally relates to the field of electronics. More particularly, some embodiments of the invention relate to per die temperature programming that may provide thermally efficient integrated circuit (IC) operation.

As integrated circuit fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may damage an IC chip by, for example, thermal expansion. Also, the additional heat may limit usage locations and/or applications of a computing device that includes such chips. To limit damage resulting from higher temperatures, some implementations are designed for the worse case scenario. For example, clock frequency may be lowered to generate less heat. This approach, however, may result in lower performance.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of some embodiments. However, some embodiments of the invention may be practiced without the specific details. In other instances, well-known methods, procedures, components, or circuits have not been described in detail so as not to obscure the particular embodiments of the invention. Moreover, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may provide efficient techniques for determining the junction temperature on a per die or IC component basis. For example, IC components with relatively lower junction temperature values may be sold or distributed as low-power consumption products. Alternatively, the clock frequency of such components may be increased to improve performance. Generally, "junction temperature" ($T_j$) as discussed herein refers to a temperature value at which an IC component starts to fail due to high temperature.

Figure 1:
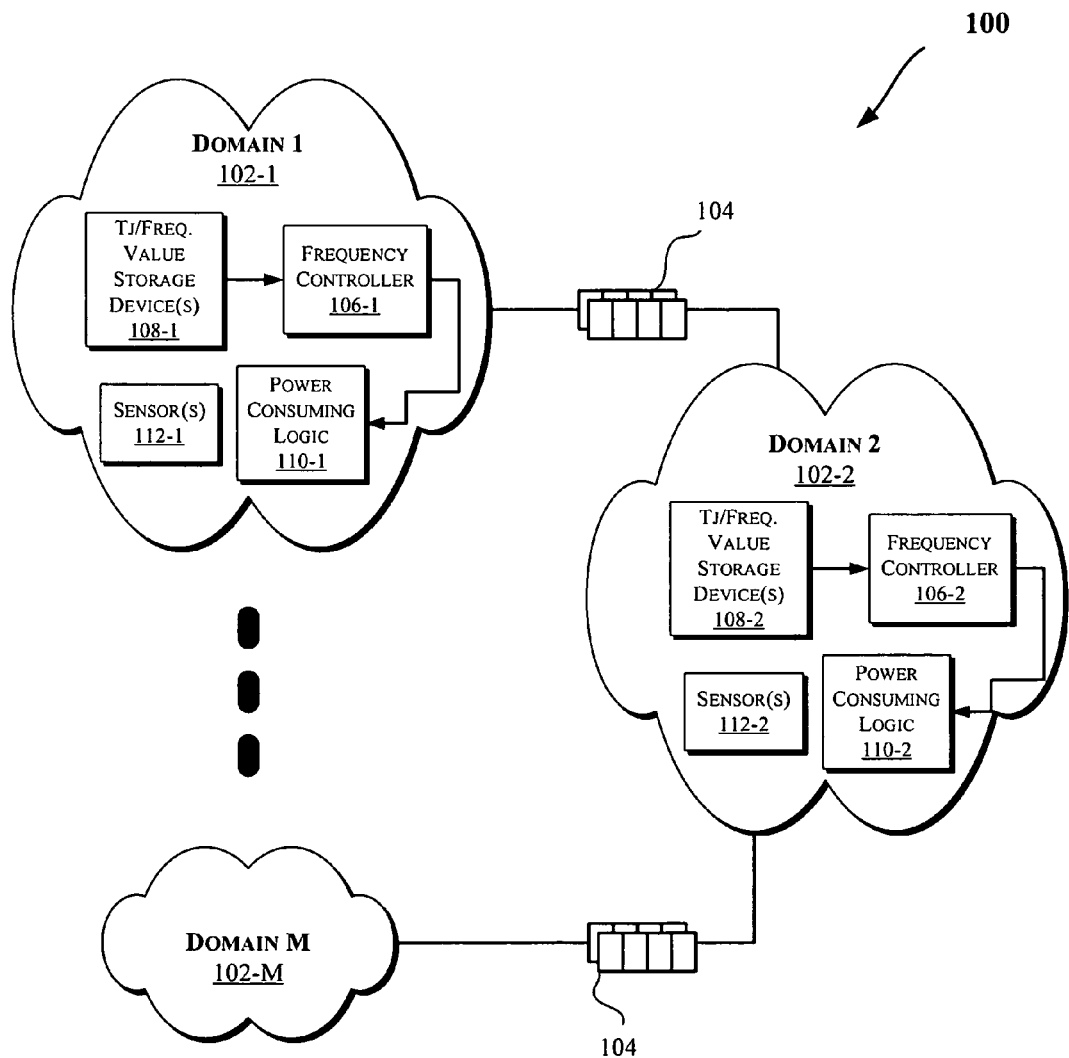
FIGS. 1, 5, and 6 illustrate block diagrams of computing systems in accordance with some embodiments of the invention.

Furthermore, some of the embodiments discussed herein may be applied in various computing systems, such as the computing systems discussed with reference to FIGS. 1, 5, and 6. More particularly, FIG. 1 illustrates a block diagram of a computing system 100, according to some embodiments. The system 100 may include one or more domains 102-1 through 102-M (collectively referred to herein as "domains 102" or more generally "domain 102"). Each of the domains 102-1 through 102-M may include various components (e.g., including one or more transistors or other electronic circuit elements such as one or more resistors, capacitors, inductors, etc.). For clarity, sample components are only shown with reference to domains 102-1 and 102-2. Also, each domain 102 may correspond to one or more portions of a computing system (such as the components discussed with reference to FIGS. 5 and 6). In some embodiments, each of the domains 102 may include various circuitry (or logic) that is clocked by a clock signal which may be the same or different from the clock signal used in other domains. In some embodiments, one or more of the clock signals may be mesosynchronous, or otherwise related (e.g., with a relationship that may or may not repeat itself over time).

In some embodiments, each domain may communicate data with other domains through one or more buffers 104. In some embodiments, the buffers 104 may be first-in, first-out (FIFO) buffers. Each domain may include one or more programmable frequency controllers (e.g., 106-1 and 106-2, and more generally referred to herein as the "frequency controllers 106" or more generally "frequency controller 106"), one or more storage devices to store one or more bits corresponding to junction temperature(s) ($T_j$) and/or frequency value(s) or level(s) (such as device(s) 108-1 and 108-2 shown with reference to domains 102-1 and 102-2, respectively), other power or energy consuming circuitry (such as logics 110-1 and 110-2 shown with reference to domains 102-1 and 102-2, respectively, and generally referred to herein as "logic 110" or "logics 110"), and/or one or more temperature sensors (such as sensor(s) 112-1 and 112-2 shown with reference to domains 102-1 and 102-2, respectively, and generally referred to herein as "sensors 112" or more generally "sensor 112"). The frequency controllers 106 may be any type of a frequency controller such as voltage-controlled oscillator (VCO).

In some embodiments, the values stored in the devices 108 for each domain may be different than values stored for other domains. As will be further discussed herein, e.g., with reference to FIG. 4, the values stored in devices 108 may be used to adjust the output frequency level of the corresponding frequency controller 106, e.g., to provide improved performance based on the junction temperature of a corresponding domain. Also, in systems with multiple power states, one or more bits may indicate the appropriate frequency level to which the corresponding controller 106 is to be tuned for each power state. Furthermore, in some embodiments, the value(s) stored in devices 108 may be determined during high volume manufacturing (HVM) testing. Also, any type of a memory device such as those discussed with reference to FIGS. 5 and 6 may be utilized to provide the storage devices 108, including a non-volatile storage device such as on-die fuse(s).

Figure 2:
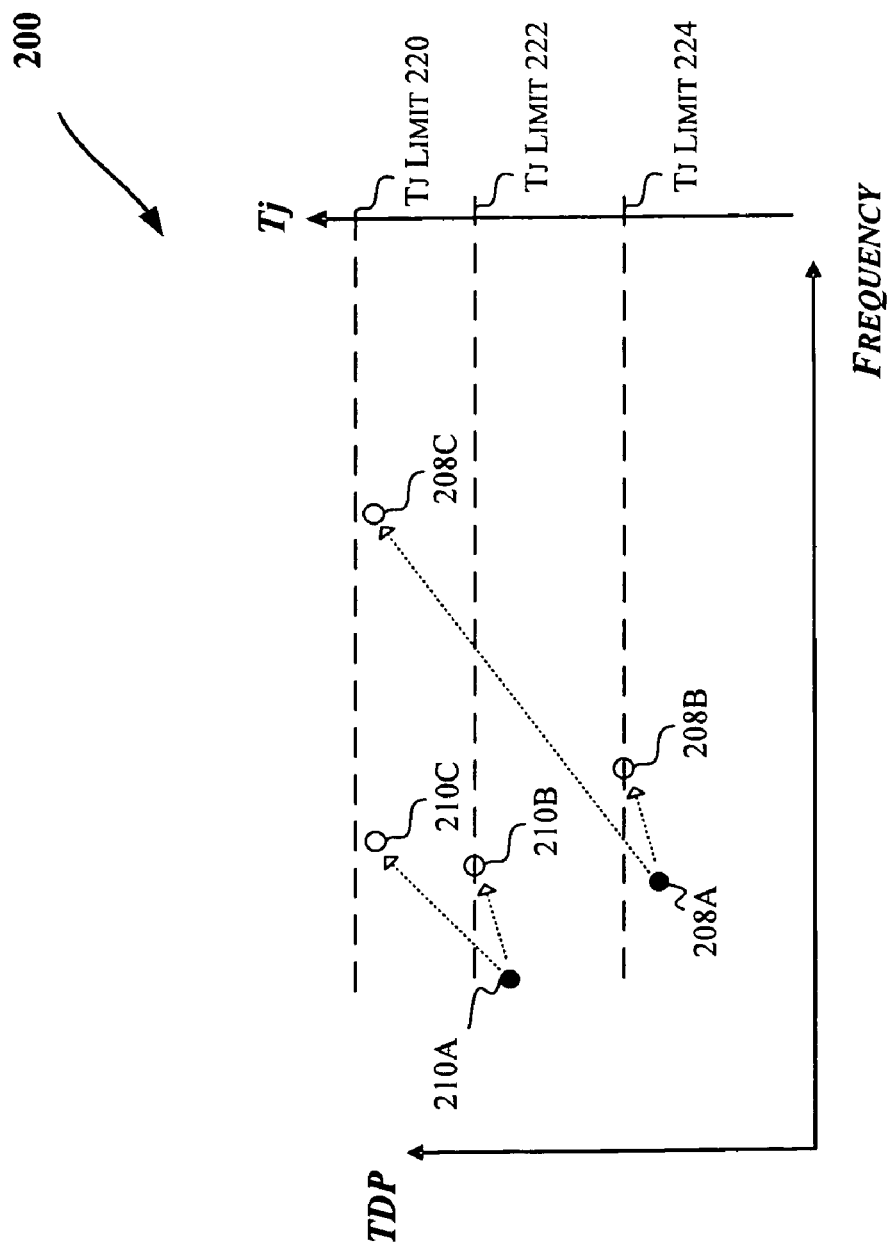
FIG. 2 illustrates a graph of thermal design power (TDP) versus frequency and junction temperature (Tj), according to some embodiments.

FIG. 2 illustrates a graph 200 of thermal design power (TDP) versus frequency and junction temperature ($T_j$), according to some embodiments. In some embodiments, the graph 200 shows that energy or power efficient IC components may be provided through adjustment of frequency such as discussed with reference to FIG. 1. Additionally, the graph illustrates that by increasing frequency IC components with a junction temperature that is lower than a threshold junction temperature (e.g., a maximum value for similar components) may be operated with improved performance. For example, components 208A and 210A may operate below a junction temperature limit 220 which may correspond to the worse case junction temperature for similar components.

As discussed with reference to FIG. 1, based on per component junction temperature values, components 208A and 210A may be distributed or sold as low-power consumption products (e.g., when compared with similar products that may have a higher individual junction temperature). Alternatively, components 208A and 210A may be operated at a higher frequency (e.g., as components 208B-208C and 210B-210C, respectively) to provide improved performance. In particular, since the junction temperatures of components 208A and 210A (e.g., $T_j$ limits 224 and 222, respectively) are less than the maximum junction temperature for similar components (e.g., $T_j$ limit 220), the operating frequency of these components may be raised to a level that approaches the $T_j$ limit 220. In some embodiments, a plurality values corresponding to these frequency levels may be stored in the devices 108 of FIG. 1, for example, corresponding to different frequency configurations for a given component (e.g., frequencies corresponding to components 208A, 208B, 208C, 210A, 210B, and/or 210C). Moreover, the values stored in the devices 108 may be determined during testing in some embodiments.

Figure 3:
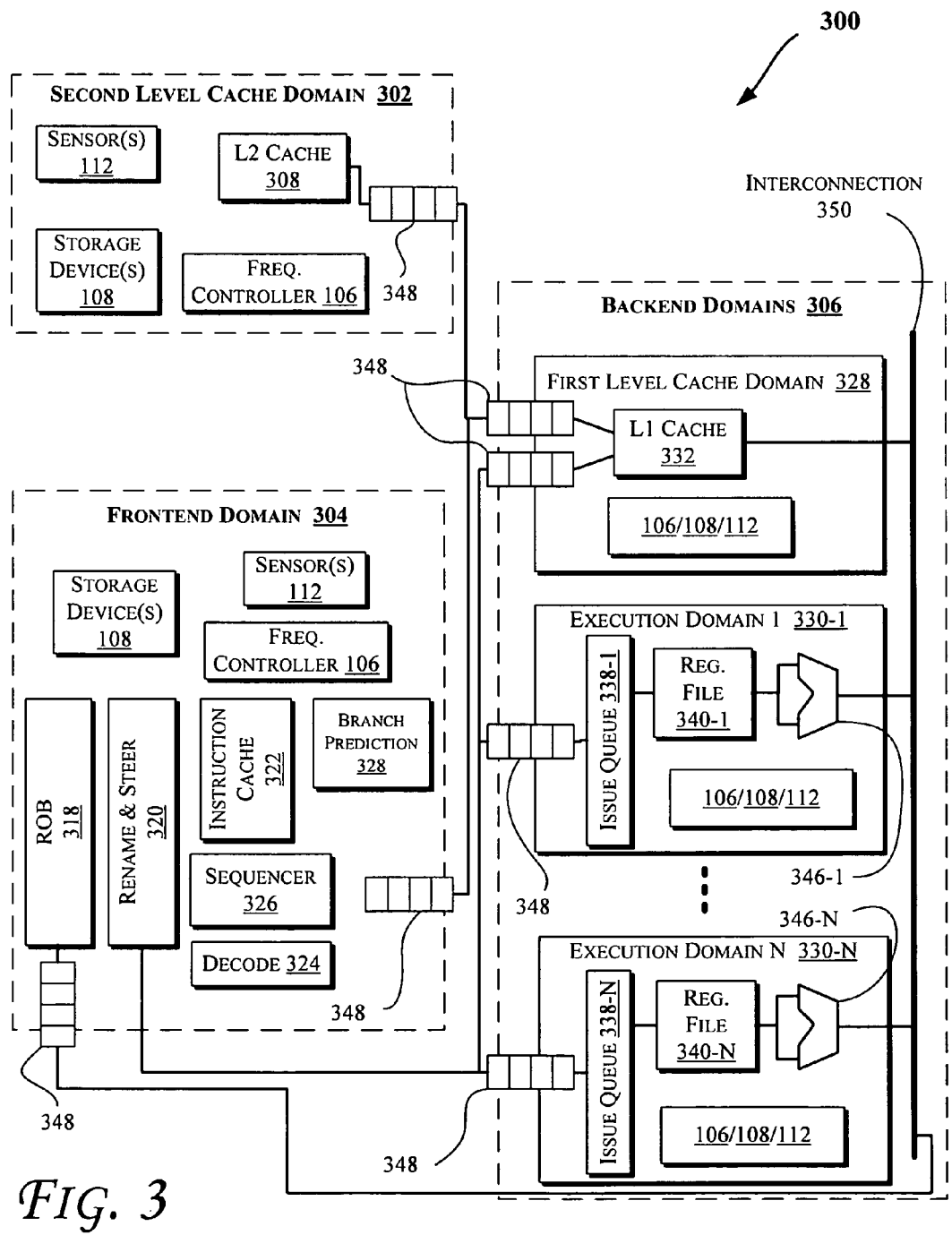
FIG. 3 illustrates a block diagram of a processor core, according to some embodiments.

FIG. 3 illustrates a block diagram of a processor core 300, according to some embodiments. In some embodiments, the core 300 may represent various components that may be present in a processor or number of processors (such as those discussed with reference to FIGS. 5 and 6). The processor core 300 may include one or more domains such as a second level cache domain 302, a frontend domain 304, and one or more backend domains 306. Components within each of the domains 302, 304, and 306 may be supplied by a different programmable frequency controller 106 such as discussed with reference to FIG. 1. Moreover, each of the domains (e.g., 302, 304, and 306) may include more or less components than those shown in FIG. 3 in some embodiments.

The second level (L2) cache domain 302 may include an L2 cache 308 (e.g., to store data including instructions), device(s) 108, programmable frequency controller 106, and sensor(s) 112. In some embodiments, the L2 cache 308 may be shared by multiple cores in a multi-core processor such as those discussed with reference to FIGS. 5 and 6. Also, the L2 cache 308 may be off of the same die as the processor cores. Accordingly, in some embodiments of the invention, a processor may include the domains 304 and 306, and may or may not include the L2 cache 308.

As shown in FIG. 3, the frontend domain 304 may include one or more of the device(s) 108, frequency controller 106, sensor(s) 112, a reorder buffer 318, a rename and steer unit 320, an instruction cache 322, a decode unit 324, a sequencer 326, and/or a branch prediction unit 328. In some embodiments, the frontend domain 304 may include other components such as an instruction fetch unit.

The backend domains 306 may include one or more of a first level (L1) cache domain 328 and one or more execution domains 330-1 through 330-N. The L1 cache domain 328 may include an L1 cache 332 (e.g., to store data including instructions), the device(s) 108, frequency controller 106, and sensor(s) 112. Furthermore, the execution domains 330-1 through 330-N may include one or more of an integer execution unit and/or a floating point execution unit. The execution domains 330-1 through 330-N may each comprise an issue queue (338-1 through 338-N, respectively), a register file (340-1 through 340-N, respectively), sensor(s) 112, frequency controller 106, device(s) 108, and/or an execution unit (346-1 through 346-N, respectively). Furthermore, in some embodiments, each of the domains 302, 304, and 306 may include one or more first-in, first-out (FIFO) buffer(s) 348 to synchronize communication between the various domains (e.g., between the domains 302, 304, and/or 306).

Additionally, the processor core 300 (and, in some embodiments, such as the one shown in FIG. 3, the backend domains 306) may include an interconnection or bus 350 to facilitate communication between various components of the processor core 300. For example, after an instruction is successfully executed (e.g., by the execution domains 330-1 through 330-N), the instruction commit may be communicated to the ROB 318 (e.g., via the interconnection 350) to retire that instruction. Additionally, the domains within the backend (e.g., domains 328 and 330-1 through 330-N) may communicate via the interconnection 350. For example, communication among execution units (330-1 through 330-N) may occur for type conversion instructions. Further operations of components of FIGS. 1-3 will be discussed with reference to method 400 of FIG. 4.

Furthermore, even though FIG. 3 illustrates that each of the domains 302, 304, and 306 may include the device(s) 108, sensor(s) 112, and controller(s) 106, various domains may share the same device(s) 108, sensor(s) 112, and/or controller (s) 106. For example, a single set of the device(s) 108, sensor (s) 112, and frequency controller(s) 106 may be utilized for all or some of the domains of the processor core 300.

Figure 4:
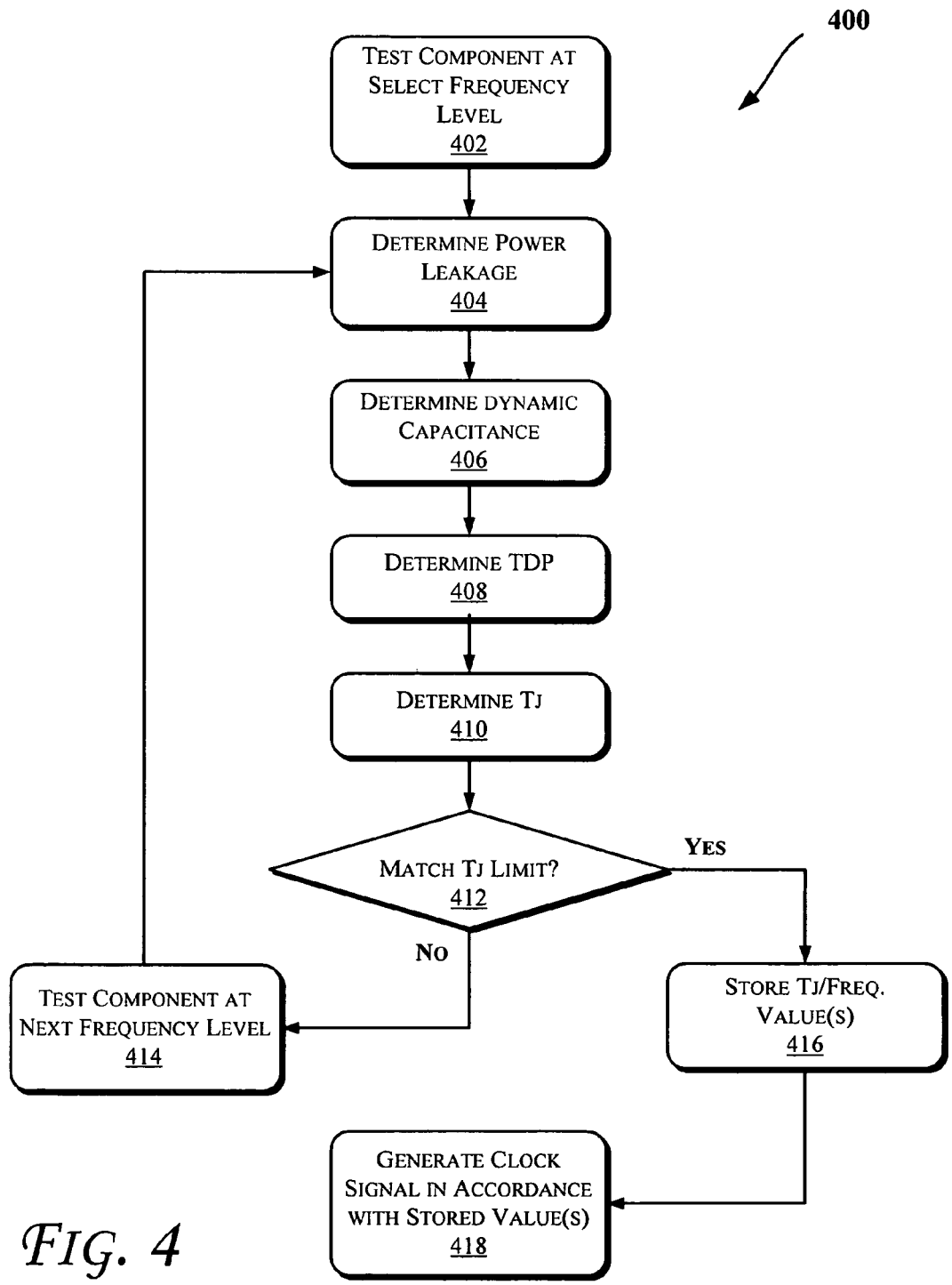
FIG. 4 illustrates a flow diagram of a method, according to some embodiments.

FIG. 4 illustrates a flow diagram of a method 400 to generate a clock signal in accordance with stored value(s), according to some embodiments. In some embodiments, the operations of the method 400 may be performed by one or more components, such as the components discussed with reference to FIGS. 1-3 and 5-6. Also, some of the operations discussed with reference to FIG. 4 may be performed by hardware, software, or combinations thereof. Furthermore, an external device such as a circuit analyzer or testing device may be used to perform various operations discussed with reference to the method 400.

Referring to FIGS. 1-4, at an operation 402, an IC component may be tested at a select frequency level after manufacturing. For example, the frequency controller 106 may be programmed to supply one of the components discussed with reference to FIGS. 1-3 and/or 5-6 with a select frequency level. At operations 404 and 406, the power leakage and dynamic capacitance of the component of operation 402 may be determined, e.g., by a circuit analyzer or testing device. At an operation 408, the corresponding TDP value of the component may be determined in accordance with the following equation:

$$TDP = (C_{dyn} * Voltage^2 * Frequency) + Leakage$$

In the above equation, TDP corresponds to the thermal design power, $C_{dyn}$ corresponds to the measured value of the dynamic switching capacitance of the silicon die when executing a realistic worst case (e.g., high power) application, Voltage corresponds to the voltage level of operation 402 (or operation 414 as will be discussed further below), Frequency corresponds to the frequency associate with a bin frequency (e.g., the frequency bin to which the IC component of operation 402 corresponds, for example, where IC components may be divided into one or more frequency bins for product differentiation and/or distribution), and Leakage corresponds to the measured leakage power. In some embodiments, a lookup table may be utilized to look up the TDP value at operation 408 based on stored values of voltage, frequency, power leakage, capacitance, etc.

At an operation 410, the junction temperature of the component ($T_j$) may be determined in accordance with the following equation:

$$T_j = T_a + TDP * R_{ja}$$

In the above equation, TDP corresponds to the TDP value determined at operation 408, $T_a$ corresponds to the measured ambient temperature, Rja corresponds to junction to ambient thermal resistance (e.g., which may be based on the cooling technology used for cooling the component of operation 402). In some embodiments, a lookup table may be utilized to lookup the $T_j$ value at operation 410 based on the values of $T_a$, TDP, $R_{ja}$, etc.

Additionally, the sensor(s) 112 may be utilized to determine the junction temperature at operation 410, for example, by comparing the sensed temperature values with a threshold junction temperature limit. The threshold junction temperature limit may correspond to the worse scenario junction temperature value determined for a plurality of similar components. If the determined $T_j$ value at operation 410 is less than or more than the threshold junction temperature limit at operation 412, the component may be tested at a next frequency level at operation 414. At an operation 414, the next frequency level may be lower or higher than the frequency level of the previous test, e.g., at a previous operation 402 or 414.

At an operation 416, once the operation 412 determines that the tested component matches the threshold junction temperature limit, the determined $T_j$ and/or one or more frequency levels (e.g., corresponding to different power states and/or different configurations such as discussed with reference to FIGS. 1-3) may be stored in device(s) 108. Moreover, the frequency values stored at operation 416 may correspond to various environments or applications where the component is to be operated. For example, components used for mobile devices may have different frequency values (e.g., with a lower TDP value) than components used in desktop or server computing environments. Furthermore, other types of product differentiation criteria may be utilized to determine the frequency values for operation 416, such as pricing per sector, country of usage, available cooling solutions, acoustic specifications, form factor, etc.

At an operation 418, the frequency controller(s) 106 may utilize the stored frequency values to generate a clock signal. In some embodiments, software and/or firmware may be used to select one of the stored frequency values at operation 416, e.g., depending on the implementation environment. For example, a user may configure a mobile computing device such that the frequency controller 106 uses the lowest frequency value stored in a corresponding device(s) 108. As discussed herein, depending on the implementation, any of the stored frequency values may be selected. Further, in some embodiments, one or more of the operations 402-418 may be performed by a computing device (such as those discussed with reference to FIGS. 5-6) through software, hardware, or combinations thereof.

Figure 5:
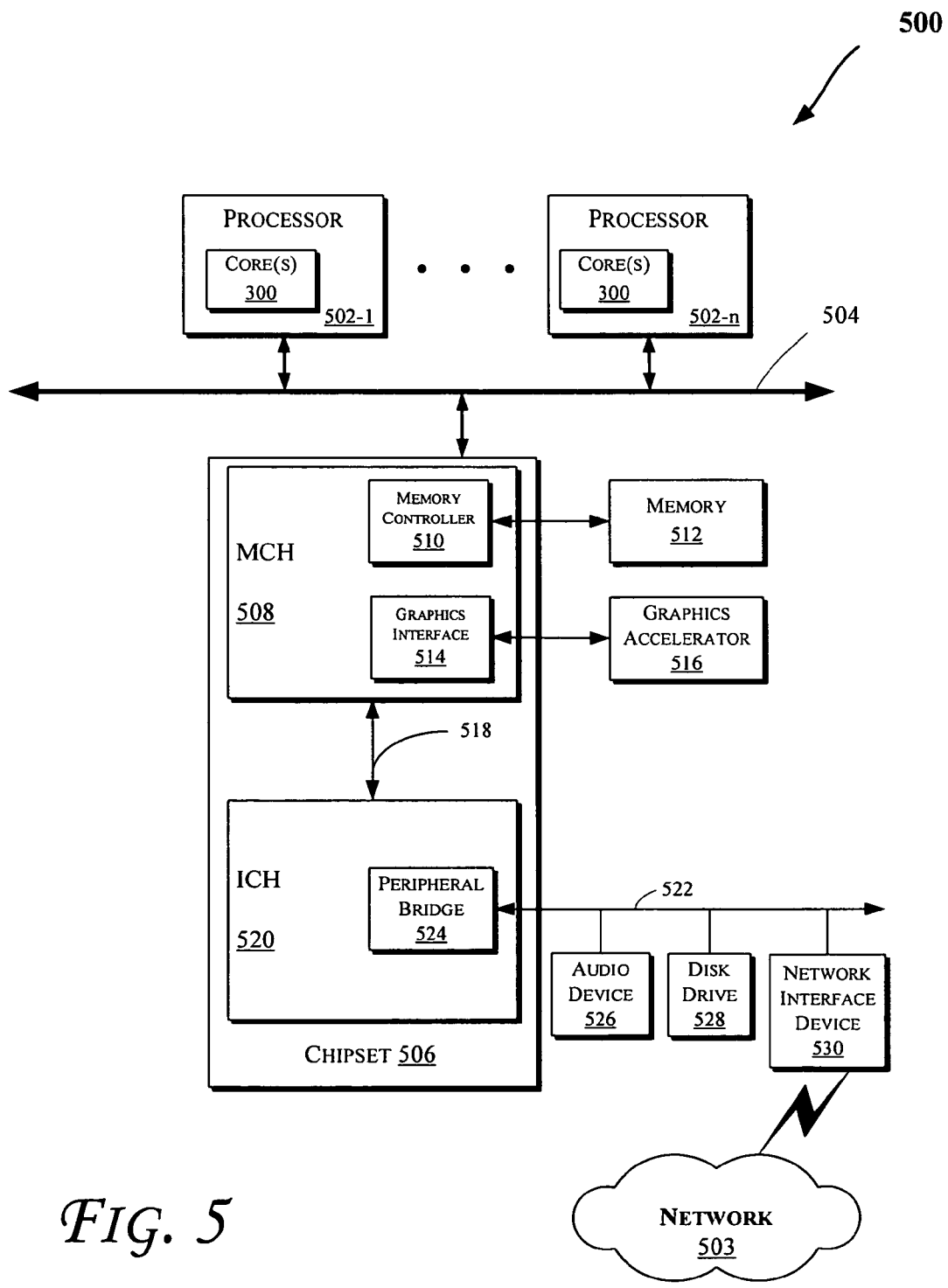

FIG. 5 illustrates a block diagram of a computing system 500 in accordance with some embodiments of the invention. The computing system 500 may include one or more central processing unit(s) (CPUs) 502 or processors that communicate via an interconnection network (or bus) 504. The processors 502 may be any type of a processor such as a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In some embodiments, one or more of the processors 502 may utilize the embodiments discussed with reference to FIGS. 1-4. For example, one or more of the processors 502 may include one or more processor cores (300). Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512. The memory 512 may store data and sequences of instructions that are executed by the CPU 502, or any other device included in the computing system 500. In some embodiments of the invention, the memory 512 may include one or more volatile storage (or memory) devices such as random access memory (RAM), dynamic RAM (DRAM), synchronous DRAM (SDRAM), static RAM (SRAM), or the like. Nonvolatile memory may also be utilized such as a hard disk. Additional devices may communicate via the interconnection network 504, such as multiple CPUs and/or multiple system memories.

The MCH 508 may also include a graphics interface 514 that communicates with a graphics accelerator 516. In some embodiments of the invention, the graphics interface 514 may communicate with the graphics accelerator 516 via an accelerated graphics port (AGP). In some embodiments of the invention, a display (such as a flat panel display) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may allow the MCH 508 to communicate with an input/output control hub (ICH) 520. The ICH 520 may provide an interface to I/O devices that communicate with components of the computing system 500. The ICH 520 may communicate with a bus 522 through a peripheral bridge (or controller) 524, such as a peripheral component interconnect (PCI) bridge, a universal serial bus (USB) controller, or the like. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in some embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or the like.

The bus 522 may communicate with an audio device 526, one or more disk drive(s) 528, and a network interface device 530 (which communicates with the computer network 503). Other devices may be in communication with the bus 522. Also, various components (such as the network interface device 530) may be in communication with the MCH 508 in some embodiments of the invention. In addition, the processor 502 and the MCH 508 may be combined to form a single chip. Furthermore, the graphics accelerator 516 may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic instructions and/or data.

Figure 6:
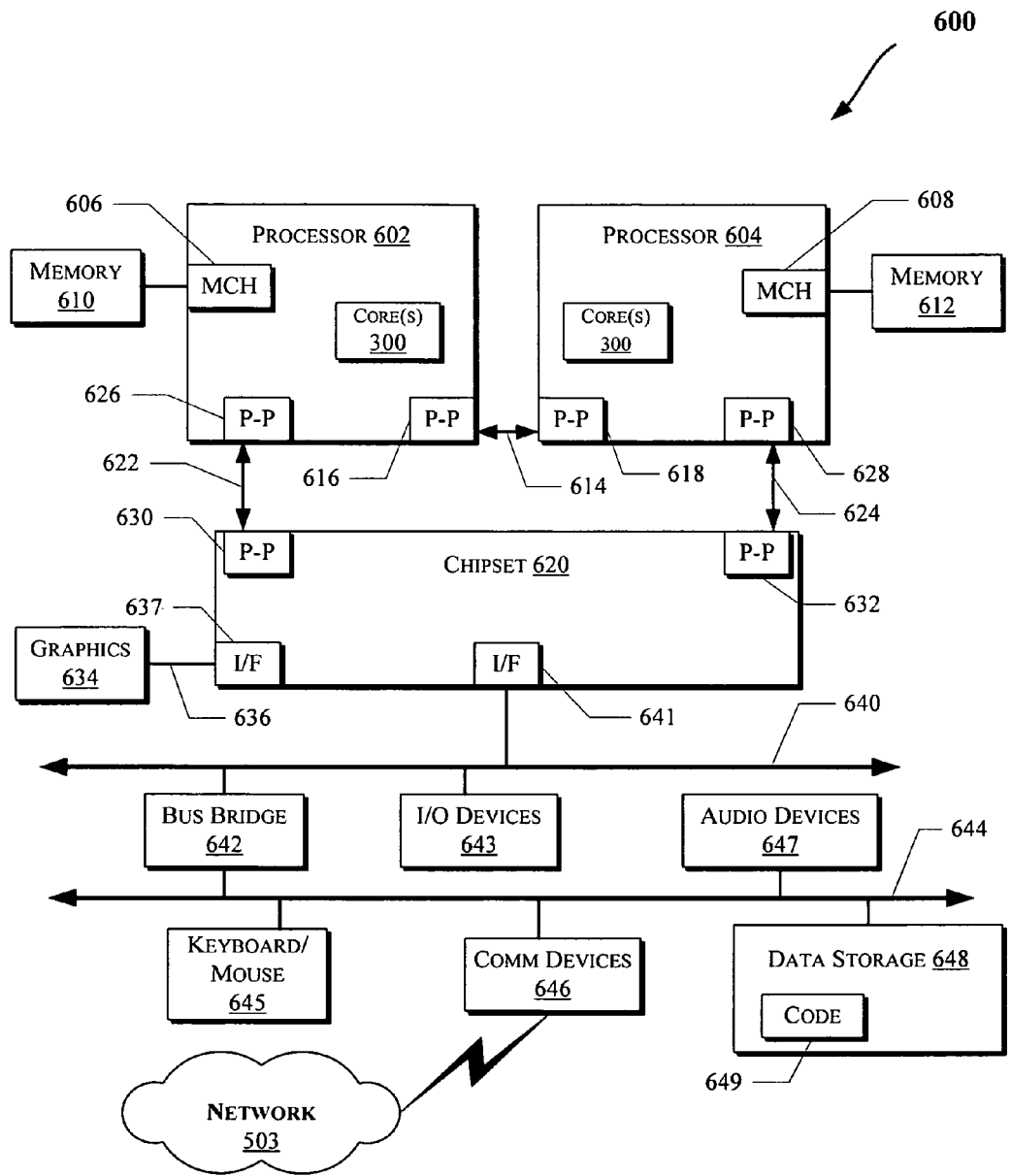

FIG. 6 illustrates a computing system 600 that is arranged in a point-to-point (PtP) configuration, according to some embodiments of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to allow communication with memories 610 and 612. The memories 610 and/or 612 may store various data such as those discussed with reference to the memory 512.

The processors 602 and 604 may be any type of a processor such as those discussed with reference to the processors 502 of FIG. 5. The processors 602 and 604 may exchange data via a point-to-point (PtP) interface 614 using PtP interface circuits 616 and 618, respectively. The processors 602 and 604 may each exchange data with a chipset 620 via individual PtP interfaces 622 and 624 using point to point interface circuits 626, 628, 630, and 632. The chipset 620 may also exchange data with a high-performance graphics circuit 634 via a high-performance graphics interface 636, using a PtP interface circuit 637.

At least some embodiments of the invention may be provided within the processors 602 and 604. For example, one or more of the domains 102 discussed with reference to FIG. 1 and/or processor core(s) 300 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may have one or more devices that communicate with it, such as a bus bridge 642 and I/O devices 643. Via a bus 644, the bus bridge 643 may be in communication with other devices such as a keyboard/mouse 645, communication devices 646 (such as modems, network interface devices, etc. that may be in communication with the computer network 503), audio I/O device, and/or a data storage device 648. The data storage device 648 may store code 649 that may be executed by the processors 602 and/or 604.

In some embodiments of the invention, the operations discussed herein, e.g., with reference to FIGS. 1-6, may be implemented by hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein.

Also, the term "logic" may include, by way of example, software, hardware, or combinations of software and hardware. The machine-readable medium may include a storage device such as those discussed with respect to FIGS. 1-6. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "some embodiments" means that a particular feature, structure, or characteristic described in connection with the embodiments may be included in at least an implementation. The appearances of the phrase "in some embodiments" in various places in the specification may or may not be all referring to the same embodiments.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
a storage device to store one or more bits that cause a logic to operate at a frequency level corresponding to a junction temperature of the logic; and
a frequency controller to generate a clock signal corresponding to the frequency level,
wherein a thermal design power of the logic is to be determined based on a value of a power leakage and a dynamic capacitance of the logic.

2. The apparatus of claim 1, further comprising one or more temperature sensors to detect the junction temperature.

3. The apparatus of claim 1, wherein one or more of the storage device, the frequency controller, or the logic are on a same integrated circuit die.

4. The apparatus of claim 1, wherein the one or more bits correspond to one or more predefined power states.

5. The apparatus of claim 1, wherein the storage device comprises a non-volatile storage device.

6. The apparatus of claim 1, wherein the logic operates in accordance with the clock signal.

7. The apparatus of claim 1, wherein the one or more bits correspond to a plurality of frequency levels.

8. The apparatus of claim 7, wherein the logic is capable of operating at each of the plurality of frequency levels and within a temperature range that is less than or equal to the junction temperature.

9. The apparatus of claim 1, further comprising one or more processor cores, wherein at least one of the one or more processor cores comprises the storage device, the frequency controller, and the logic.

10. The apparatus of claim 1, further comprising one or more processor cores, wherein at least one of the processor cores, the storage device, the frequency controller, and the logic are on a same integrated circuit die.

11. A method comprising:
   determining a junction temperature of a logic;
   storing one or more data bits corresponding to one or more frequency levels in a storage device;
   generating a clock signal in accordance with at least one of the frequency levels that causes the logic to operate at a temperature that is equal to or less than the junction temperature; and
   determining at least one of: a thermal design power (TDP) of the logic based on stored values corresponding to power leakage and dynamic capacitance of the logic or a value of dynamic capacitance of the logic during operation of the logic.

12. The method of claim 11, further comprising determining the junction temperature based on a thermal design power (TDP), an ambient temperature, and a junction to ambient thermal resistance of the logic.

13. The method of claim 11, further comprising determining a value of power leakage generated during operation of the logic.

14. The method of claim 11, further comprising determining a thermal design power (TDP) of the logic during operation of the logic.

15. The method of claim 11, further comprising determining the junction temperature based on stored values corresponding to a thermal design power (TDP), an ambient temperature, and a junction to ambient thermal resistance of the logic.

16. A system comprising:
   a display device to display one or more images;
   a non-volatile memory to store one or more bits corresponding to one or more frequency levels;
   a programmable frequency controller coupled to the display device and configured to generate a clock signal in accordance with at least one of the frequency levels to cause a logic to operate at a temperature that is equal to or less than a junction temperature of the logic; and
   a plurality of processor cores to generate data corresponding to the one or more images.

17. The system of claim 16, wherein the display device comprises a liquid crystal display (LCD) device.

18. A computer-readable medium comprising one or more instructions that when executed on a processor configure the processor to:
   determine a junction temperature of a logic;
   store one or more data bits that cause the logic to operate at a frequency level corresponding to the junction temperature of the logic; and
   determine the thermal design power of the logic based on a value of a power leakage and a dynamic capacitance of the logic.

19. The computer-readable medium of claim 18, further comprising one or more instructions that configure the processor to determine the junction temperature based on a thermal design power (TDP), an ambient temperature, and a junction to ambient thermal resistance of the logic.

* * * * *